United States Patent

[11] 3,562,500

| [72] | Inventor | Michael P. Grant<br>Columbus, Ohio |
|---|---|---|
| [21] | Appl. No. | 706,144 |
| [22] | Filed | Feb. 16, 1968 |
| [45] | Patented | Feb. 9, 1971 |
| [73] | Assignee | Industrial Nucleonics Corporation<br>a corporation of Ohio |

[54] COMPOSITE PROFILE APPARATUS AND METHOD
25 Claims, 2 Drawing Figs.

| [52] | U.S. Cl. | 235/151.3, 235/151.35 |
|---|---|---|
| [51] | Int. Cl. | G01d 21/00 |
| [50] | Field of Search | 235/151.3, 151.35, 150.53; 250/83.3D; 73/75, 73 |

[56] References Cited
UNITED STATES PATENTS

| 3,191,015 | 1965 | Hansen et al. | |
| 3,212,127 | 1965 | Flook, Jr. et al. | 18/2 |

Primary Examiner—Malcolm A. Morrison
Assistant Examiner—Edward J. Wise
Attorneys—Lowe and King, William T. Fryer, III, C. Henry Peterson and James J. O'Reilly

ABSTRACT: Disclosed are a system for and method of analyzing a property of a moving sheet in response to sampled data derived from a plurality of scans of a transducer for the property across the sheet. A composite profile of the plural scans is obtained by averaging the property values for corresponding across the sheet points over several scans. To preserve computer memory, the average values of a plurality of samples within each scan are derived and then stored. The number of sampling points within each scan is determined either on an a priori basis or in response to the ratio over the several scans of the total variance of the process to a predetermined, desired variance of the average of the property determined from the sampled values within each scan. The number of sampling points comprising a single average is selected as an odd number.

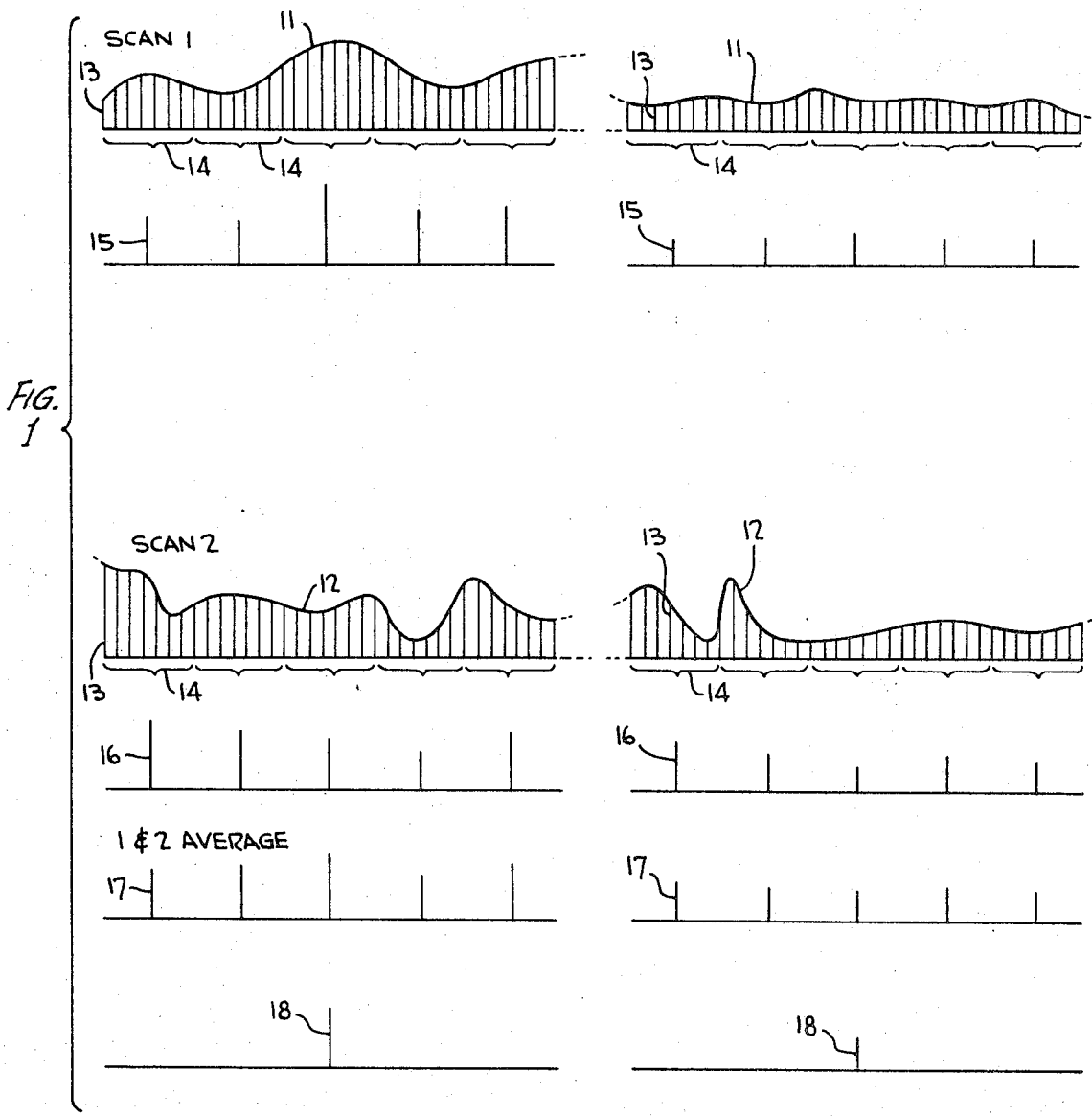

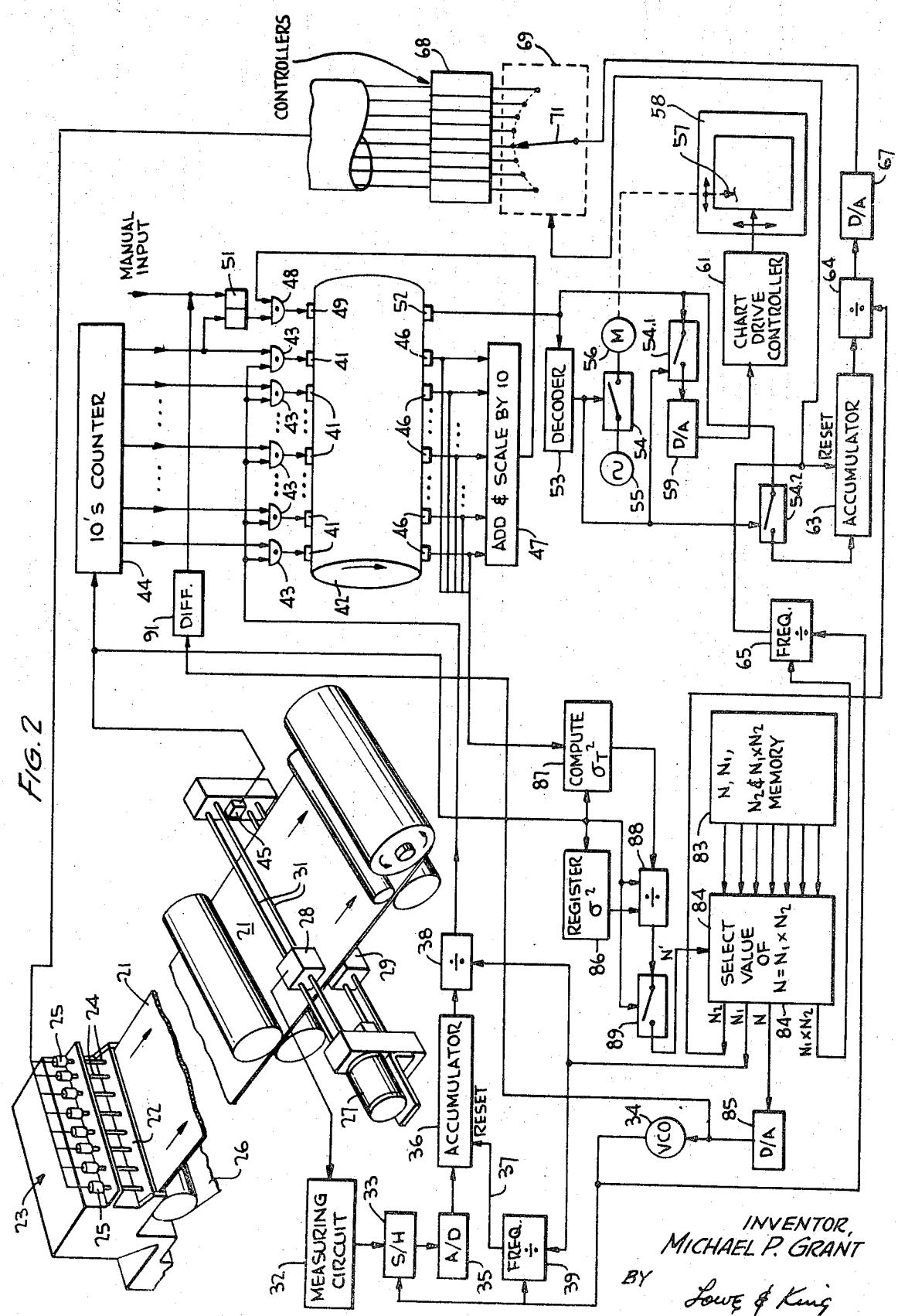

COMPOSITE PROFILE APPARATUS AND METHOD

The present invention relates generally to computers for determine a property of moving sheets in response to sampled data and more particularly to a digital computer system and method wherein the average value of the property over a plurality of sampling points is derived and fed to storage.

The analysis of property indicating data derived from a measuring gauge scanning across a moving sheet through the use of digital computers has been recognized as advantageous for both analysis involves deriving a composite profile from several scans across a sheet of the property measuring gauge. The composite profile is found by averaging property indicating values derived from corresponding points across the width of the sheet in response to the several scans.

Digital computers for deriving composite profile data from the measured data must be supplied with inputs indicative of sampled outputs of the scanning gauge. To provide accurate data indicating the property variations, it is usually necessary during each scan to sample the gauge output a relatively large number of times, determined by the variance of the property being analyzed. In the manufacture of paper, for example it is typically required to provide 280 sampling points across the width of a sheet. Generally, a composite profile is derived in response to 10 gauge scans, whereby 2800 data points must be stored to extract composite profile information. When it is considered that each data word includes 10 to 14 bits, it is appreciated that the capacity of a digital storage device for storing all of the data required for composite profile is on the order of 28,000 to 42,000 bits. These FIGS. represent an appreciable segment of most available digital computer memories, whereby computation of composite profile leaves little, if any storage for other parameters which must be considered.

In accordance with the present invention, a technique has been evolved whereby the memory requirements of a digital computer storing data necessary for a composite profile are considerably reduced. In particular, I have found that relatively accurate indications of a single profile may be derived by averaging data taken from a plurality of sampling points during a scan and feeding the average to computer memory. For example, if 280 sampling points are required to provide an accurate indication of a sheet property for each transducer scan, the 280 sampling points are required to provide an accurate indication of a sheet property for each transducer scan, the 280 samples can be broken down into 40 averages, each of which is responsive to the values at seven sampling points. By taking the required number of samples, as dictated by the statistical properties of the process being measured, and then averaging the sampled values, relatively accurate indications of the process are derived. In contrast, however, if the number of sampling points were reduced and the samples taken at less frequent intervals, the presence of noise in the data would considerably increase the error in the data. Taking the required number of samples per scan and reducing the effective number of sampling points by averaging provides an accurate analysis, while reduction in the number of sampling points, without averaging, is likely to cause errors. The errors are introduced by random property variations having characteristics like noise, and are therefore eliminated to a large extent by averaging.

In accordance with the present invention, averaging is accomplished with digital equipment, rather than on an analogue basis. Digital averaging is important because a digital computer is effectively isolated through a periodically activated sample and hold network while it is being reset after each averaging operation. If averaging were accomplished with a measuring gauge and an analogue integrator, the integrator would be connected directly to the gauge output. The time required to reset the integrator, the integrator would be connected directly to the gauge output. The time required to reset the integrator after each sample period is likely to result in the loss of considerable information. The averaging or accumulating apparatus of a digital computer can be reset between samples without having any effect on the data indications derived because the sample and hold network always remains responsive to the gauge output.

According to a further feature of the invention, the number of sampling points utilized in computing each average is always preferably an odd number. By selecting the number of sampling points within each average as an odd number, the average value coincides with an actual sampling point. If the number of sampling points in an averaging scan were even, the average value would correspond with a point on the sheet that was not actually sampled with a possible impairment in accuracy of the computed average. If the computed composite profile is used for controlling devices affecting the property across the sheet width, a further criterion for the number of sampling points is that an odd number of averages is preferably used in forming a control signal for each device in the cross machine direction.

According to still another aspect of the invention, the number of sampling points in each scan is varied automatically in response to property variances (standard deviation squared) of a sheet being analyzed. In particular, the number of sampling points is computed in response to the ratio of $(\sigma T)^2/$, where: $(\sigma T)^2$ = (actual total standard deviation of the property over a number of scans)$^2$ = total process variance; and Q equals a predetermined constant that is a function of the desired accuracy. For example, the value of Q can be determined specifically by the desired variance of the average of the property determined from the sample points. The ratio determining the number of sampling points is compared with a plurality of stored values commensurate with possible numbers of sampling points, based upon the criterion of odd number of samples in each average.

It is, accordingly, an object of the present invention to provide a new and improved computer system for and method of analyzing a property of a moving sheet, wherein the requirements of computer memory are appreciably reduced.

Another object of the present invention is to provide a system for accurately representing profile data indicative of a property of a sheet by averaging data from a plurality of sampling points together and then feeding the resultant average to computer memory.

Another object of the present invention is to provide a system for and method of determining automatically the number of sampling points of a property to be derived from a gauge scanning the width of a moving sheet.

A further object of the present invention is to provide a new and improved system for and method of controlling a cross machine direction parameter of a moving sheet in response to computed, composite profile data.

The above and still further objects, features and advantages of the present invention will become apparent upon consideration of the following detailed description of one specific embodiment thereof, especially when taken in conjunction with the accompanying drawings, wherein:

FIG. 1 is a waveform analysis of the operations performed in accordance with the present invention; and FIG. 2 is a block diagram of an embodiment of the present invention.

The present invention is described in conjunction with the analysis and manufacture of a sheet of paper in response to scanning a basis weight (weight per unit area) gauge across the width of the paper. It is to be understood, however, that the teachings of the invention are equally applicable to the analysis and control of other processes and variables; for example, measuring the basis weight or plastic or metal in formation or moisture in paper formation. In addition, the teachings of the invention are not confined to scanning gauges positioned at the sampling points.

Reference is now made to FIG. 1 of the drawings wherein segmented waveforms 11 and 12 represent the responses of a penetrating radiation basis weight gauge making adjacent scans across a paper sheet at two different machine direction locations, i.e. at different segments along the length of the paper sheet. Each of waveforms 11 and 12 is plotted against an ordinate representing distance across the width of a paper sheet and an abscissa representing basis weight. The values of basis weight in each of waveforms 11 and 12 are determined by the basis weight variance. Typically, 280 sampling points are required to provide accurate indications of the basis weight variations. The basis weight samples, represented by vertical lines 13 in waveforms 11 and 12, are grouped together, into several groups indicated by brackets 14. The number of samples $N_1$, in each of brackets 14 is an odd number, usually 3, 5, 7, or 9, and is selected so that the number of groups, $N/N_1$, in each scan is an integer. For the purpose of the present example, it is assumed that seven sampling points are each of the groups forming brackets 14.

According to the invention, the average value of the seven sampled basis weights comprising each group is determined, as indicated by vertical lines 15. The 280 sampling points in each scan are thereby reduced to 40 average sampled points; each average value as it is computed is supplied to a computer memory. After the average values for the first scan, waveform 11 have been computed and stored in memory, the basis weight gauge scans across the sheet a second time, at which time average values 16 are derived by the computer and fed to memory. After a predetermined number, K, of scans, typically 10, has been completed, the average values 17 at corresponding points across the width of the sheet are calculated to provide the composite profile of the sheet basis weight. The average profiles are displayed on a suitable strip chart recorder as a function of cross machine direction.

If control of a process parameter affecting cross direction basis weight is desired, average values 17 are combined into a number of groups equal to the number of cross machine direction controllers available. The number, $N_2$, of average values in each of these groupings is also an odd number, whereby each controller is supplied with a signal average taken from the center of the sheet region at a point affected by the controller. The value $n_2$ is selected so the ratio $N/N_1N_2$ is an integer equal to the number of controllers. The position and value for the composite profile for two across the sheet controllers is shown by lines 18.

Reference is now made to FIG. 2 of the drawings wherein there is illustrated a system for and method of analyzing and controlling cross direction basis weight of paper sheet 21 during formation. Paper sheet 21 is formed in response to a high velocity jet of water and fiber mixture emerging from slice 22 of headbox 23. Headbox 23 includes a plurality of separately adjustable, vertically driven screws 24, each of which is responsive to a different servoactuating motor 25. The jet emerging from slice 22 is directed toward moving conveyor or Fourdrinier wire 26, which causes some of the moisture in the sheet being formed to be drained.

Downstream of Fourdrinier wire 26 is positioned scanning gauge mount 27 for supporting nuclear radiation gauge detector head 28 and nuclear radiation source 29 both of which are mounted on traversing guide tubes 31. Gauge 28 and source 29 are scanned together across the width of sheet 21, from one edge of the sheet to another, by motor means (not shown), whereby the detector derives a signal proportional to the basis weight of the segment of sheet 21 being irradiated. The signal derived from detector 28 is fed to measuring circuit 32, the output of which is a DC voltage instantaneously proportional to the basis weight of sheet 21 being irradiated by source 29.

The analogue, profile indicating output of measuring circuit 32 is applied continuously to sample and hold network 33. Sample and hold network 33 is periodically activated in response to pulses from voltage controlled oscillator 34, whereby the instantaneous potential fed thereto by gauge 28 is fed to analogue-to-digital converter 35. The frequency of oscillator 34 is adjusted so that the number of pulses supplied thereby to network 33 during each scan of gauge 28 equals N. Analogue-to-digital converter 35 thereby periodically derives a binary signal indicative of the basis weight values 13 at each of the sampling points of waveform 11, FIG. 1.

To compute the average value of a group of successive samples forming groups 14, FIG. 1, the output of analogue-to-digital converter 35 is supplied to accumulator 36. After all of the samples forming a particular group 14 have been derived from analogue-to-digital converter 35, the contents of accumulator 36 are read out and reset to a zero level in response to the signal on lead 37. Accumulator 36 is reset after $N_1$ samples from circuit 32 have been gated to converter 35 through network 33 to provide accumulation of the sampled basis weights only in each grouping indicated by brackets 14. In particular, the output of oscillator 34 is fed to the reset input of accumulator 36 by frequency divider 39, the division factor of which is set in response to $N_1$. The value of $N_1$ can be selected on a preassigned basis, from a priori knowledge regarding the variance of the process, or it may be computed automatically as indicated infra. In the illustrative embodiment described in conjunction with waveforms 11 and 12, FIG. 1, $N_1 = 7$.

Simultaneously with each resetting operation, the contents of accumulator 36 are read out into the numerator input of digital dividing network 38, the divisor input of which is a binary signal indicative of $N_1$. The output of divider 38, a digital signal indicating the average value within each of groups 14, is applied in parallel to write-in heads 41, disposed along parallel paths of magnetic drum computer memory 42. The number of channels in memory 42 responsive to heads 41 is equal to the number, K, of scans forming each composite profile. The signals from division network 38 are applied to heads 41 via AND gates 43, one of which is provided for each of the write-in heads. Each of AND gates 43 is enabled in sequence; the gate enabled is determined by the number of the scan of source 29 and detector 28 across sheet 21. In particular, AND gates 43 are sequentially enabled in response to the output of counter 44, having a capacity equal to the number of scans required to enable an accurate composite cross direction analysis to be derived. Counter 44 is advanced by a count of one in response to each scan of detector 28 and source 29 across the width of sheet 21 in response to the detector engaging microswitch 45, at the extreme far end of the sheet. Counter 44 automatically returns to its lowest order after every tenth scan of detector 28 and source 29 across sheet 21, whereby write-in heads 41 are sequentially and repeatedly energized.

Data are written into the parallel channels of drum memory 42 from write-in heads 41 so that averages from corresponding points across the width of sheet 21 are at the same position along the surface of the drum. Thereby, at an arcuate position $\theta_1$, the average values for the first group of each of the ten scans are written, while at the arcuate position $\theta_2$, the average values for the second groups of each of the ten scans are written. To derive the profile analysis, on drum 42 are provided readout heads 46, one of which being included for each of the channels receiving data from write-in heads 41. Readout heads 46 thereby simultaneously derive average values commensurate with identical cross direction segments of the basis weight of sheet 21 for each of the ten scans stored in the drum memory. The outputs of readout heads 46 are applied to a computer arithmetic unit comprising adding and scale by K (K being generally equal to 10) matrix 47, the output of which is a digital word having a value proportional to the composite basis weight for a particular cross machine position, indicated by values 17, FIG. 1.

The composite profile signal derived from add and scale matrix 47 is selectively fed to an accumulator channel of memory drum 42 via AND gate 48 and write-in head 49. AND gate 48 is enabled by the output of flip-flop 51 after ten scans have been completed by detector 28 and source 29 across the width of sheet 21. To this end, the set input of flip-flop 51 is responsive to the trailing edge of highest order output of tens counter 44. After flip-flop 51 is activated to the set state by the output of counter 44 it remains in the set state by the output of counter 44 it remains in the set state as long as the system stays in operation and the value of N does not change; the flip-flop is reset only in response to a manual signal entered by an operator upon initial activation of the system or change in N. Composite signals are thereby entered into drum memory 42 via head 49 only after 10 scans of detector 28 and source 29 have been completed so that an accurate profile measurement is fed into drum via write-in head 49.

While the gating system disclosed is suitable in many instances for controlling accurate accumulation of data into the accumulator channel of magnetic drum 42, it is to be understood that more complex averaging systems may be employed for determining profile without waiting for ten scans of detector 28 and source 29 across sheet 21. In particular, add and scale network 47 can be replaced by an addition matrix cascaded with a digital divider, the divisor input of which is indicative of the number of scans of detector 28 and source 29 across sheet 21, when the number is less than 10. In the alternative, an exponential time weighting scheme may be employed at all times, as disclosed in the copending application of Edward J. Freeh, filed Nov. 13, 1967, bearing Serial No. 682,336, and commonly assigned with the present invention.

To read out the 40 profile indicating words in sequence from the accumulator channel of drum 42 responsive to write-in head 49, there are provided readout head 52 and decoder 53, responsive to the readout head. In addition to the sequentially derived profile representing bits read into drum 42 via write-in head 49, the accumulator channel includes first and second nonerasable coded words respectively arranged on the drum memory immediately before and after the profile indicating words. In response to the first coded word being read out from head 52, decoder 53 derives a signal to close the contacts of switches 54, 54.1 and 54.2, enabling the profile data to be read from the memory into output devices.

One of the output devices responsive to profile data read from memory readout head 52 is strip chart recorder 58, having a pen 57 that is moved: across the chart to indicate cross machine direction of the sheet; and relative to the sheet length in response to the profile basis weight outputs of head 52. To couple the inputs to recorder 58 as the profile data are read from memory 42, the output of decoder 53 closes switches 54 and 54.1 in response to the first coded word being sensed by decoder 53. Switches 54 and 54.1, as well as switch 54.2, remain closed until the second word is detected by decoder 53. In response to switch 54 closing, AC source 55 is coupled to synchronous motor 56. Motor 56 drives the pen 57 of chart recorder 58 at constant velocity across the width of the chart to simulate the translation of detector 28 and source 29 across sheet 21 while switch 54 is closed between detection of the coded words.

Pen 57 is deflected vertically relative to the chart it is marking in response to the profile data derived from readout head 52 as coupled through closed switch 54.1 to digital-to-analogue converter 59. Converter 59 responds to the profile indicating binary signal to generate a DC output that drives motor 61, which in turn rotates rollers of recorder 58 to translate the recorder chart relative to pen 57.

Upon reading out all of the profile data stored in the accumulator memory channel, the second coded word is read from memory by head 52 and detected by decoder 53. In response to the second word being detected by decoder 53, switches 54, 54.1 and 54.2 are opened again, whereby the drive for recorder motor 61 is terminated and pen 57 is returned to it original starting position by conventional means, not shown. Thus, chart recorder 58 provides a display of composite profile basis weight of sheet 21 after ten scans of detector 28 and source 29 have been completed; in addition, a new composite basis weight profile is recorded for the previous scans in response to each subsequent scan of the detector and source The display on the chart of recorder 58 comprises 40 finite steps, each having a value commensurate with the average of seven sampled points.

In addition to providing a visual analysis of the composite cross direction profile of basis weight as determined by detector 28 and source 29, the present invention can be utilized for controlling cross machine direction basis weight by varying the positions of screws 24. To provide control signals for screws 24, the profile indicating signals derived from the accumulator memory channel and read by head 52 must be averaged amongst the eight screws across the width of slice 22. To this end, a digital averaging network comprising accumulator 63 and division network 64 is provided. Division network 64 may be a fixed divider if sufficient a priori knowledge regarding the statistical nature of the basis weight is available or it may be responsive to a variable, odd-numbered division input, $N_2$. In any event, the value $N_2$ is selected to be an odd integer which when divided into the number of average profiles read from head 52 equals eight, the number of screws 24.

To enable averages to be ascertained from the profile data, accumulator 63 is reset after $N_2$ words have been read from head 52. To this end, the reset input of accumulator 63 is responsive to the output of frequency divider 65 that is driven from the pulses generated by oscillator 34. The division factor of divider 65 is set to equal the product of $N_1$ $N_2$, either on a manual basis or automatically in a manner seen infra.

From the foregoing analysis, it is seen that there is derived from division network 64 a signal indicative of the basis weight for each of the eight areas across the width of sheet 21. To effect control with the eight sequentially generated signals, the output of divider 64 is applied to digital-to-analogue converter 67. The eight sequentially derived analogue output signals of converter 67 are time division multiplexed to controllers 68 that activate motors 25, which in turn drive screws 24. Control of the application of the output of converters 67 to controllers 68 is via eight position multiplexing switch 69, having an armature 71 driven in response to the output of frequency divider 65. While multiplexing switch 69 is illustrated as being of the electromechanical type, it is to be understood that in actual practice it may comprise an electronic switch for coupling the output of converter 67 in sequence to each of controllers 68. Controllers 68 respond to: (1) the measured signals applied thereto by switch 69; (2) target or set point indications for the basis weight across the width of sheet 21; and (3) signals indicative of the position of screws 24 to actuate motors 25 to adjust the screw positions.

As indicated supra, the number of sampling points, N, and the factors $N_1$ and $N_2$ may be selected on an a priori basis or the value of N can be computed from the statistical properties of sheet 21 being examined. If the values of N, $N_1$ and $N_2$ are predetermined and not subject to variation, the frequency of oscillator 34 is constant and the inputs to dividers 38 and 64 and frequency dividers 39 and 65 are constant, being respectively equal to $N_1$ or $N_2$, or the product of $N_1 N_2$.

If a more sophisticated system is desired wherein the number of sampling points is varied in response to the statistical distribution of basis weight in sheet 21, the number, $N'$, of sampling points is determined by computing the ratio over the preceding scans of detector 28 of the total basis weight variance to a desired, a priori variance of basis weight average, i.e., $N' = \sigma T^2 / Q$.

Initially and prior to a calculation of $N'$, the value of N is selected from a priori knowledge regarding expected basis weight variance properties of sheet 21 and equals a value on the order of 280. The value of N is derived from memory 83 via gating accomplished by selection network 84. The digital indication of N is fed to digital-to-analogue converter 85. The analogue output of converter 85 commensurate with the value of N is applied as a control voltage to voltage controlled oscillator 34, whereby oscillator 34 drives N pulses during each fixed time scan of detector 28 and source 29 across paper 21.

In response to the N samples taken during each scan of detector 28 and source 29, the total basis weight variance for the last 10 scans is determined by computing network 87 in response to the signals stored in the 10 parallel channels of memory 42, derived from readout heads 46. The circuitry and formulation for computation of total process variance in network 87 is disclosed in a copending application of Spitz et al., Serial No. 682,402, filed Nov. 13, 1967, having a common assignee with the present invention. The total variance, digital output of network 87 is divided in division network 88, by a predetermined desired basis weight variance stored in register 86. The output of division network 88 is a digital signal indicative of the optimum number, N′, of sampling points to be taken during the next scan of detector 28 and source 29 across the width of sheet 21.

To prevent possible erroneous coupling of signals between circuit elements 86—88 and selection network 84, each of the circuit elements 86—88 is activated only after a scan of detector 28 and source 29 across the width of sheet 21, as indicated by the output of microswitch 45. For the same reason, the output of division network 88 is coupled to the input of selection network 84 via switch 89 only in response to microswitch 45 being energized.

Selection network 84 responds to the indicated value of the number of sampling points, N′, derived from divider 88 and compares the divider output with numbers stored in memory 83. The numbers, N, stored in memory 83 are selected such that $N = N_1 \times N_2 \times N_3$, where:

$N_3$ is the number of screws 24 comprising slice 22; and
$N_1$ and $N_2$ are odd integers.

In addition, the value of $N_1$ must be such that there is a sufficient number of sampling points applied to recorder 58 to enable the recorder to provide graph having a somewhat continuous appearance. To this end, the quotient $N/N_1$ must generally equal at least 20. Selection network 84 responds to the stored values of N in memory 83 and the computed value N′ derived from divider 88 and selects the value, N, from memory 83 that is closest to the value of N′. Once selection network 84 determines the value of N in memory 83 closest in value to the value of N′, the factors $N_1$ and $N_2$ stored in the memory are read through the selection gates to dividers 38 and 64, as well as frequency dividers 39. In addition, the product $N_1 \times N_2$, which is stored in memory 83, is read through selection gate 84 to frequency divider 65.

Typical values for N, $N_1$, $N_2$ and the product $N_1 N_2$ as stored in memory 83 with a system having eight slice screws 24 are given by Table I.

TABLE I $N = N_1 \times N_2 \times N_3$

| | | | |
|---|---|---|---|
| 1 | 120 | 3 | 5 | 8 |
| 2 | 168 | 3 | 7 | 8 |
| 3 | 200 | 5 | 5 | 8 |
| 4 | 216 | 9 | 3 | 8 |
| 5 | 264 | 11 | 3 | 8 |
| 6 | 280 | 7 | 5 | 8 |
| 7 | 312 | 13 | 3 | 8 |
| 8 | 360 | 9 | 5 | 8 |
| 9 | 392 | 7 | 7 | 8 |
| 10 | 408 | 17 | 3 | 8 |
| 11 | 440 | 11 | 5 | 8 |
| 12 | 456 | 19 | 3 | 8 |
| 13 | 504 | 9 | 7 | 8 |

From Table I it is seen that the number of sampling points that may possibly be included is variable between 120 and 504. If the computed value of N′ is less than 120 or greater than 504, the system memory feeds the appropriate factors for these numbers through selection gate 84.

In the event the value of N selected by network 84 should change, generally an infrequent occurence since the performance of the machinery in a paper mill and the quality of the input material to the mill are not subject usually to very wide fluctuations, it is necessary to decouple the memory 42 channels associated with heads 41 and 46 from accumulator channel responsive to head 49. Such isolation is necessary since mingling data derived from scans having different numbers of samples would cause inaccurate profiles. To decouple the outputs of heads 46 from head 49 for 10 scans after the value to N is changed, network 91 which is connected to the output of converter 85. Network 91, which is a conventional differentiator, responds to the variations in the output voltage of converter 85 to derive a binary one signal pulse whenever there is a change in N. The binary one output of network 91 is applied in parallel to reset inputs of flip-flop 51 and counter 44. Thereby, a new profile cycle is, in effect, initiated each time a substantial change in the variance properties of the sheet occurs, as reflected in the comparison of N′ derived from division circuit 88 and the stored values of N.

While I have described and illustrated one specific embodiment of my invention, it will be clear that variations in the details of the embodiment specifically illustrated and described may be made without departing from the true spirit and scope of the invention as defined in the appended claims. For example, it is to be understood that the teaching of the present invention may also be incorporated as a program in a general purpose computer, as well as with the hard wire system disclosed specifically herein.

I claim:

1. A system for deriving profile data of a property of a sheet in response to digital indications derived from measurements of the property at a multiplicity, N, of sampling points across the width of the sheet, one of said indications being derived for each of said points, comprising means responsive to said indications for averaging a plurality, $N_1$, of said indications and for deriving several average value digital signals for different regions across the width of the sheet, digital storage means responsive to the averaging means for storing each of said average value digital signals, and arithmetic means responsive to said storage means for deriving a digital signal indicative of a statistical function of the property at each of said regions.

2. The system of claim 1 wherein said averaging means is responsive to an odd number of said indications in deriving each of said average value digital signals, the numbers N and $N_1$ being selected whereby the number, $N/N_1$ of average values derived for the sheet width is an integer.

3. The system of claim 2 further including readout means responsive to said arithmetic means for displaying $N/N_1$ signals indicative of functions of the $N/N_1$ average values versus positions across the width of the sheet.

4. The system of claim 2 in combination with means for controlling the property of the sheet, said property controlling means including $N/N_1$ sections across the width of the sheet, said arithmetic means deriving $N/N_1$ signals indicative of functions of the property at the $N/N_s$ ection, and means responsive to said arithmetic means for adjusting each of said sections in response to the corresponding one of the $N/N_1$ signals derived from the arithmetic means.

5. The system of claim 1 wherein said arithmetic means includes means for deriving digital signals indicative of the total variance of the property over a substantial length of the sheet and of a function of the desired variance of the property, and means responsive to said variance indicating signals for controlling the value of N.

6. The system of claim 5 wherein said averaging means is responsive to an odd number of said indications in deriving each of said average value digital signals, the numbers N an $N_1$ being selected whereby the number, $N/N_1$, of averaging values derived for the sheet width is an integer.

7. A system for deriving composite profile data of a sheet property in response to an analogue detector for said property being scanned across the sheet width at least K times to derive the composite profile, each scan being at a different machine direction location, comprising means for sampling the analogue output of said detector a multiplicity of times, N, during each scan, means for converting each of the sampled analogue outputs to a separate digital signal, means responsive to said separate digital signals for averaging a plurality, $N_1$, of said digital signals, and for deriving approximately $N/N_1$ digital average value signals for each scan of the detector, whereby each average value signal is indicative of the property value at a different region across the sheet width, digital storage means responsive to each of said average value signals, and arithmetic means responsive to said storage means for averaging the K signals stored for each of the regions and deriving a digital signal indicative of the composite profile.

8. The system of claim 7 wherein said averaging means is responsive to an odd number of said indications in deriving each of said average value digital signals, the numbers N and $N_1$ being selected whereby the number, $N/N_1$, of average values derived for the sheet width is an integer.

9. The system of claim 8 further including means responsive to said arithmetic means for displaying $N/N_1$ signals indicative of functions of the $N/N_1$ average values versus positions across the width of the sheet.

10. The system of claim 7 in combination with means for controlling the property of the sheet, said property controlling means including $N/N_1$ sections across the width of the sheet, and means responsive to said arithmetic means for adjusting each of said sections in response to the corresponding one of the $N/N_1$ average value signals derived from the arithmetic means.

11. The system of claim 7 wherein said arithmetic means includes means for deriving digital signals indicative of the total variance of the property over a substantial length of the sheet and of a function of the desired variance of the property, and means responsive to said variance indicating signals for controlling the value of N.

12. The system of claim 11 wherein said averaging means is responsive to an odd number of said indications in deriving each of said average value digital signals, the numbers N and $N_1$ being selected whereby the number, $N/N_1$, of average values derived for the sheet width is an integer.

13. A method of deriving composite profile data of a sheet property comprising scanning an analogue detector for said property across the width of the sheet at least K times, each scan being at a different machine direction location, sampling the analogue output of said detector a multiplicity of times, N, during each scan, converting each of the sampled analogue outputs to a separate digital signal, averaging a plurality, $N_1$, of said digital signals, and deriving approximately $N/N_1$ digital average value signals for each scan of the detector, whereby each average value signal is indicative of the property value at a different region across the sheet width, storing in a digital storage means each of said average value signals, and averaging in a digital arithmetic unit the K signals stored for each of the regions to derive a digital signal indicative of the composite profile.

14. The method of claim 13 further including the step of adjusting the value of the property at a plurality of points across the sheet width in response to the value of the digital signal indicative of composite profile.

15. The method of claim 13 wherein the number of samples taken during each scan is determined by ratio of the total sheet variance of the property over the K scans to a desired variance of the property average determined from N sampling points.

16. A system for deriving profile data of a property of a sheet in response to digital indications derived from measurements of the property at a multiplicity, N, of sampling points across the width of the sheet, one of said indications being derived for each of said points, comprising means responsive to said indications for accumulating a plurality, $N_1$, of said indications derived from adjacent sampling points and for deriving several accumulated value digital signals for different regions across the width of the sheet, and arithmetic means responsive to the accumulated digital signals of the different regions for deriving a digital signal indicative of a statistical function of the property.

17. The system of claim 16 wherein said arithmetic means includes means for accumulating the accumulated value digital signals separately for each of the different regions.

18. The system of claim 17, wherein said arithmetic means includes means for deriving an indication of the average profile of the property for the different cross sheet regions derived in response to measurements made of the property at several locations along the sheet in the machine direction.

19. The system of claim 18 including readout means responsive to said arithmetic means for displaying $N/N_1$ signals indicative of functions of the $N/N_1$ accumulated values versus regions across the width of the sheet.

20. The system of claim 17 in combination with means for controlling the property of the sheet, said property controlling means including $N/N_1$ sections across the width of the sheet, said arithmetic means deriving $N/N_1$ signals indicative of the average profile of the property at each of $N/N_1$ regions, and means responsive to said arithmetic means for adjusting each of said sections in response to the corresponding one of the $N/N_1$ average profile signals derived from the arithmetic means.

21. The system of claim 17 wherein said arithmetic means includes means for deriving a variance function of the property in response to digital indications derived from measurements of the property at several locations along the sheet in the machine direction.

22. A system for deriving data indicative of a sheet property in response to a detector for said property being scanned across the sheet width at least K times to derive the composite profile, each scan being at a different machine location, comprising means for sampling the output of said detector a multiplicity of times, N, during each scan, means for deriving a separate digital signal in response to each of the sampled analogue outputs, means responsive to said separate digital signals for accumulating a plurality, $N_1$, of said digital signals, and for deriving approximately $N/N_1$ digital accumulated value signals for each scan of the detector, whereby each accumulated value signal is indicative of the property value at a different region across the sheet width, and arithmetic means responsive to the digital accumulated value signals for the different regions for accumulating the K accumulated signals derived for each of the regions during the K scans.

23. A method of deriving data indicative of a sheet property comprising scanning a detector for said property across the width of the sheet at least K times, each scan being at a different machine direction location, sampling the output of said detector a multiplicity of times, N, during each scan, deriving a separate digital signal in response to each of the sampled outputs, accumulating a plurality, $N_1$, of said digital signals to derive approximately $N/N_1$ digital accumulated value signals for each scan of the detector, whereby each accumulated value signal is indicative of the property value at a different region across the sheet width, and accumulating in a digital arithmetic unit the K signals derive for each of the regions.

24. The method of claim 23 wherein the K signals are accumulated in the arithmetic unit to derive a digital signal indicative of the composite profile of the property.

25. The method of claim 23 wherein the K signals are accumulated in the arithmetic unit to derive a digital signal indicative of a variance function of the property.